United States Patent
Kelman et al.

[11] Patent Number: 5,364,159
[45] Date of Patent: Nov. 15, 1994

[54] STRUCTURAL INSTRUMENT PANEL CARRIER ASSEMBLY

[75] Inventors: Josh Kelman, Dover; John Gray, Union, both of N.H.; Michael Gorman, Bloomfield Township, Oakland County, Mich.

[73] Assignee: Davidson Textron Inc., Dover, N.H.

[21] Appl. No.: 78,140

[22] Filed: Jun. 15, 1993

[51] Int. Cl.⁵ .......................................... B62D 25/08
[52] U.S. Cl. .................................. 296/192; 296/70; 296/208; 180/90; 454/143
[58] Field of Search .............. 296/70, 72, 192, 194, 296/208; 180/90; 454/143, 145-148

[56] References Cited

U.S. PATENT DOCUMENTS

| | | | |
|---|---|---|---|
| 3,234,309 | 2/1966 | Graff | 264/516 |
| 4,391,465 | 7/1983 | Piano | 296/208 |
| 4,733,739 | 3/1988 | Lorenz et al. | 180/90 |
| 4,759,568 | 7/1988 | Paefgen et al. | 280/732 |
| 4,988,144 | 1/1991 | Johnson et al. | 296/192 |
| 5,005,898 | 4/1991 | Benedetto et al. | 296/194 |
| 5,082,078 | 1/1992 | Umeda et al. | 180/90 |
| 5,088,571 | 2/1992 | Burry et al. | 180/90 |
| 5,096,243 | 3/1992 | Gembinski | 293/120 |

FOREIGN PATENT DOCUMENTS

| | | | |
|---|---|---|---|
| 0494562 | 7/1992 | European Pat. Off. | 296/194 |
| 3634559 | 6/1987 | Germany | 296/70 |

*Primary Examiner*—Dennis H. Pedder
*Attorney, Agent, or Firm*—Reising, Ethington, Barnard, Perry & Milton

[57] ABSTRACT

A motor vehicle body has an instrument panel construction that includes a structural instrument panel carrier of plastic material for mounting instrument panel components. The carrier is attached to side pillars located at a juncture of passenger and engine compartments so as to form a cross beam. The instrument panel construction has its external appearance determined by adding facial instrument panel coverings to the instrument panel carrier after the instrument panel components are mounted on the instrument panel carrier. The structural instrument panel carrier may also be integrated with a front of dash (FOD) panel that may be composed of the same material and that provides a second cross beam.

12 Claims, 3 Drawing Sheets

STRUCTURAL INSTRUMENT PANEL CARRIER ASSEMBLY

BACKGROUND OF THE INVENTION

This invention relates to an instrument panel construction for a vehicle body and more particularly to an instrument panel construction that has an instrument panel carrier that serves as a structural component of the vehicle body.

Motor vehicle bodies customarily include a frame or underbody that has a pair of vertical stations or A-pillars on the opposite sides of the vehicle body at the juncture of the engine compartment and the passenger compartment. These stantions or A-pillars are connected to each other by a cross beam at the cowl of the vehicle body. See, for example U.S. Pat. No. 4,391,465 granted to Renzo Piano Jul. 5, 1983 which discloses a body structure that has side stantions that are connected to each other by two cross beams, one of which is at the cowl of the vehicle in the vicinity of the instrument panel.

Instrument panel constructions that include structural components that act as a cross beam connecting the stantions or A-pillars of the vehicle body are also known. For example U.S. Pat. No. 4,733,739 granted to Siegfried Lorenz, Erich Altdorf and Hans Vogt Mar. 29, 1988 discloses a scuttle-dash instrument panel component comprising a central support part 2 of a rigid polyurethane foam material fibre-reinforced from a mat of continuous fibers and a second lower support part 3 likewise of fibre-reinforced rigid polyurethane foam material. The central support part 2 and the lower support part 3 are securely joined together along their approximately horizontal junction plane by a thin-film adhesive 7 so as to produce a rigid box-like transverse support which cooperates in force-transmitting manner with the bodywork structure by way of lateral flanges 8 and 9 at the junction plane. However, this rigid box-like transverse support has several drawbacks. The support parts 2 and 3 are molded in very complex shapes to absorb all the necessary ventilating and heating or air-conditioning units in a fully integrated form. Consequently load sharing is difficult and the parts are expensive to manufacture. Furthermore these complex molded plastic parts 2 and 3 must be joined together in a precise manner which adds further to the manufacturing expense. Moreover the load is transferred to the transverse support by way of lateral flanges at the junction plane of the two parts which concentrates the load at the flanges and increases the stress in these parts in and near the flanges. Another drawback is that the lower support part determines the interior styling in large part.

U.S. Pat. No. 4,759,568 granted to Franz Paefgen and Hermann Guhl Jul. 26, 1988 discloses an instrument panel construction for a motor car that includes a light alloy beam 1 which extends over the whole width of the vehicle compartment below the windshield and which carries an instrument top 2. This construction avoids at least some of the problems associated with the two-piece molded plastic construction discussed above. However, the light alloy beam 1 determines the interior styling in large part and it does not have any provision for holding several components associated with instrument panels, such as heating and ventilating or air conditioning units and controls, glove boxes, radios and knee bolsters.

U.S. Pat. No. 5,088,571 granted to Donald R. Burry and Leonard J. Pilato Feb. 18, 1992 discloses a modular structural instrument panel carrier comprising panels 28 and 40 that are attached together to define a box beam assembly 54 which extends transversely across the vehicle. The panels 28 and 40 are preferably constructed of fiber reinforced plastic. This structure has many of the drawbacks that are associated with U.S. Pat. No. 4,733,739 granted to Siegfried Lorenz, Erich Altdorf and Hans Vogt Mar. 29, 1988 that is discussed above. Namely, the box beam assembly 54 consists of two complex molded plastic parts 28 and 40 that must be joined together in a precise manner which causes load sharing problems and expense. Moreover the load is transferred solely to the part 28 which concentrates the load and increases the stress in this parts. Furthermore panels 28 and 40 do not have any provision for holding instrument panel components such as bolster pads and wiring ducts.

SUMMARY OF THE INVENTION

The object of this invention is to provide an instrument panel construction that has a structural instrument panel carrier that acts as a cross beam for connecting the side stantions or A-pillars to each other at or near the cowl of the vehicle body and that avoids one or more of the drawbacks that are enumerated above.

A feature of the instrument panel construction of the invention is that it has a structural instrument panel carrier of one piece plastic construction which is less expensive to manufacture than plastic box beams of two piece construction or light alloy beams.

Another feature of the instrument panel construction of the invention is that it has a structural instrument panel carrier of one piece plastic construction that has conformations that strengthen the carrier and provide support for various instrument panel components.

Another feature of the instrument panel construction of the invention is that it has a structural instrument panel carrier of one piece plastic construction that has a lower panel for supporting knee bolsters and wiring ducts.

Another feature of the instrument panel construction of the invention is that the structural instrument panel carrier is universal in nature in that it provides a backbone for an instrument panel that can be tailored for a variety of vehicle styles simply by changing facial instrument panel coverings.

Another feature of the instrument panel construction of the invention is that the structural instrument panel carrier is adapted to support instrument panel components, including air distribution ducts and glove boxes.

Another feature of the instrument panel construction of the invention is that the instrument panel construction has a structural instrument panel carrier that acts as a cross beam and that is adapted to support a variety of facial instrument panel coverings for changing interior designs and styles.

Still another feature of the instrument panel construction of the invention is that the instrument panel construction has a structural instrument panel carrier that acts as a cross beam for controlling energy management as well as supports styling driven instrument panel components such as air distribution ducts, gloveboxes, and air bag canisters.

Still yet another feature of the instrument panel construction according to another aspect of the invention is that the instrument panel construction has a structural instrument panel carrier that can be integrated with a front-of-dash (FOD) panel composed of the same material. This aspect of the invention incorporates the structural functions currently and conventionally provided by the an FOD panel, cowl and steel cross beam and the functions of the structural instrument panel carrier into a single composite plastic member.

Still another feature of this aspect of the invention is that the integrated design provides two cross beams connecting the side stantions or A-pillars in the vicinity of the cowl, namely that of the structural instrument panel carrier and that of the FOD panel.

Still yet another feature of the instrument panel construction according to yet another aspect of the invention is that the instrument panel construction has a structural instrument panel carrier that not only acts as a cross car beam for connecting the side stantions or side pillars to each other but also has ductwork integrated into it.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
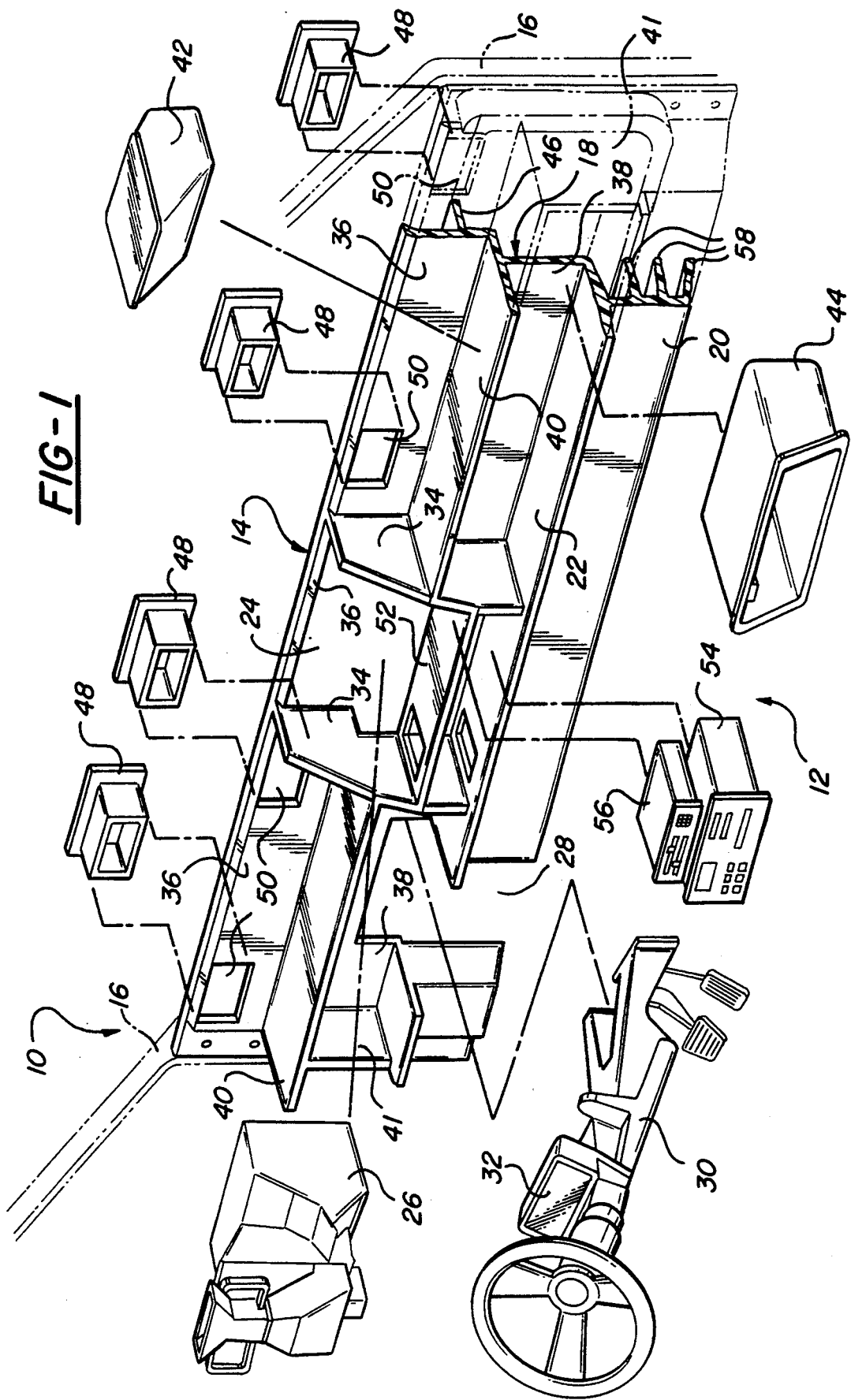
FIG. 1 is a perspective view of a vehicle body having an instrument panel construction in accordance with the invention.

Referring now to the drawing, FIG. 1 shows a motor vehicle body 10 that has an instrument panel construction 12 that includes a structural instrument panel carrier 14 in accordance with the invention. The structural instrument panel carrier 14 mounts instrument panel components in the motor vehicle body 10 between the side stantions or A-pillars 16. These A-pillars are located at a juncture of passenger and engine compartments and typically carry hinges for supporting swinging front vehicle doors.

The A-pillars 16 are typically connected by a cross beam at the cowl, and in this case, the structural instrument panel carrier 14 serves as a cross car beam that is connected to the A-pillars at its ends to reinforce the vehicle body and increase its torsional rigidity. The structural instrument panel carrier 14 is molded as one piece of strong thermoplastic material, preferably a fiber filled thermoplastic material such as urethane filled with fiberglass. It may be produced using known structural reaction injection molding (SRIM) technology, or it may be another plastic or metal/plastic hybrid construction material having similar rigid properties.

The structural carrier 14 has upper and lower generally vertical back panels 18 and 20 that extend transversely across the motor vehicle body for attachment to the A-pillars 16 and a generally horizontal shelf panel 22. The shelf panel 22 interconnects the upper and lower back panels 18, 20 and projects rearwardly of the back panels toward the passenger compartment for supporting instrument panel components as explained below.

The upper back panel 18 has a central opening 24 for a heating, ventilating, air conditioning ("HVAC") module 26 that includes a fan and inlet and outlet ducts for connection to an air distribution system. The lower back panel 20 has an opening 28 for a steering column assembly 30 that carries an instrument package 32. The steering column opening 28 which is on the driver side of the vehicle is laterally spaced from the central opening 24 of the upper panel 18.

The shelf panel 22 and the lower back panel 20 each have a portion on the passenger side of the vehicle that extends far enough to span the central opening 24 in the upper back panel 18 and preferably extends all the way to the steering column opening 28.

The structural carrier 14 also has two laterally spaced vertical walls 34 at the sides of the central opening 24 in the upper back panel 18 that are integrally connected to respective edges of the upper back panel 18 defining the central opening 28. The vertical walls 34 project rearwardly of the upper back panel 18 with their bottom edges being integrally connected to the shelf panel 22 that spans the central opening 24. The laterally spaced vertical walls 34 provide a compartment for a portion of the HVAC module 26 and increase the torsional rigidity and bending strength of the one-piece structural carrier 14.

The upper back panel 18 comprises an upper section 36 and a lower section 38 that are interconnected by a rib 40 that projects rearwardly of the sections 36 and 38 to support instrument panel components that face the passenger compartment, such as air bag module 42 and to support other instrument panel components, such as glove box 44 in cooperation with the shelf panel 22. The rib 40 has portions on either side of the central opening 28 that are integrally connected to the vertical walls 34 respectively.

The structural instrument panel carrier 14 also preferably includes a second pair of vertical walls 41 that are integrally connected to the lower section 38, the rib 40 and the shelf panel 22 at the respective outboard ends of the panel carrier 14 to increase its strength.

Figure 2:
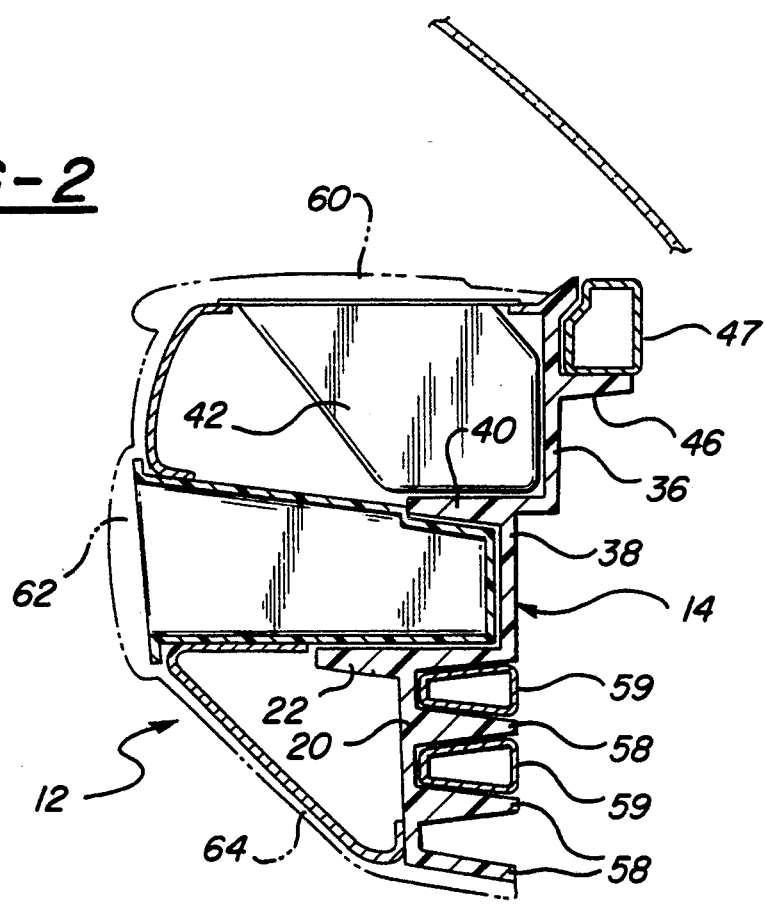
FIG. 2 is a cross section of the structural instrument panel construction shown in FIG. 1.

The upper section 36 of the upper back panel 18 has a second rib 46 that projects forwardly of the upper section 36 toward the engine compartment. The second rib 46 supports air ducts 47 on either side of the central opening 24 as shown in FIG. 2. The air ducts 47 are connected to an air outlet of the HVAC module 26 when it is assembled to the carrier 14 by suitable manifolding that may be a part of the air ducts 47 or HVAC module 26. The air ducts 47 distribute air to the passenger compartment via sleeves 48 that are fitted in a plurality of air passages 50 that extend through the upper section 36.

The structural instrument panel carrier 14 further comprises a short shelf 52 that is connected the vertical walls 34 above the shelf panel 22 to provide a compartment for an instrument panel component, such as radio 54. The shelf 52 itself also provides support for an instrument panel component such as an HVAC control module 56.

The lower back panel 20 has a plurality of integrally attached fins 58 that project forwardly toward the engine compartment beneath the shelf panel 22 to support wiring ducts 59.

The structural instrument panel carrier 14 is the "backbone" of the instrument panel construction 12 that has its external appearance determined by adding facial instrument panel coverings as shown in FIG. 2 in phantom. These include a topper pad 60, glovebox door 62, lower knee bolsters 64 that may be attached to the lower vertical back panel 20 and other surface items as shown in phantom in FIG. 2.

The entire instrument panel construction of this embodiment can be assembled off-line as a modular instrument panel construction and installed through the windshield opening.

Figure 3:
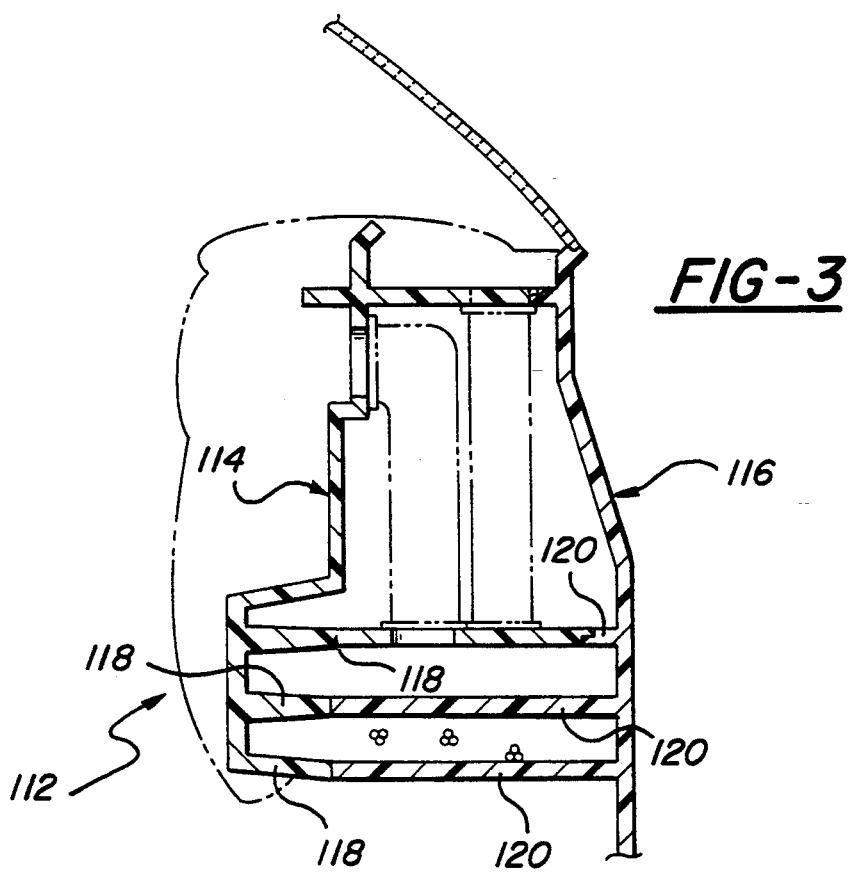
FIG. 3 is a cross section of an instrument panel construction in accordance with a second embodiment of the invention.

Another embodiment of the invention is shown in FIG. 3. Here the instrument panel construction 112 has a structural instrument panel carrier 114 that is integrated with a front-of-dash (FOD) panel 116 that is composed of the same thermoplastic material, preferably a fiber filled thermoplastic material such as urethane filled with fiberglass. Each part may be produced using known SRIM technology.

The instrument panel construction 112 incorporates the structural functions currently and conventionally provided by the FOD panel, cowl and steel cross beam in addition to the functions of the structural instrument panel carrier 14 that is disclosed above and described in connection with FIGS. 1 and 2. The integrated design of the instrument panel construction 112 provides two cross beams connecting the side stantions or A-pillars of the vehicle body in the vicinity of the cowl, namely that of the structural instrument panel carrier 114 itself and that of the FOD panel 116.

The structural instrument panel support 114 and the FOD panel 116 are molded separately and tied together adhesively via pluralities of respective integral mating ribs 118 and 120 that space the panels 114 and 116 longitudinally. These vertical and horizontal ribs form passages and compartments for wiring harnesses, air ducts, HVAC unit, glovebox and other instrument panel components.

The instrument panel construction 112 integrates instrument panel carrier 114 and FOD panel 116 in a composite molding of two or more parts using a known process such as SRIM.

This composite molding is also the "backbone" of an instrument panel construction 112 that is completed by adding topper pad, glovebox door and other interior surface items as shown in phantom in FIG. 3.

The entire instrument panel construction of this embodiment likewise can be assembled off-line as a modular instrument panel assembly and installed through the windshield opening.

Figure 4:
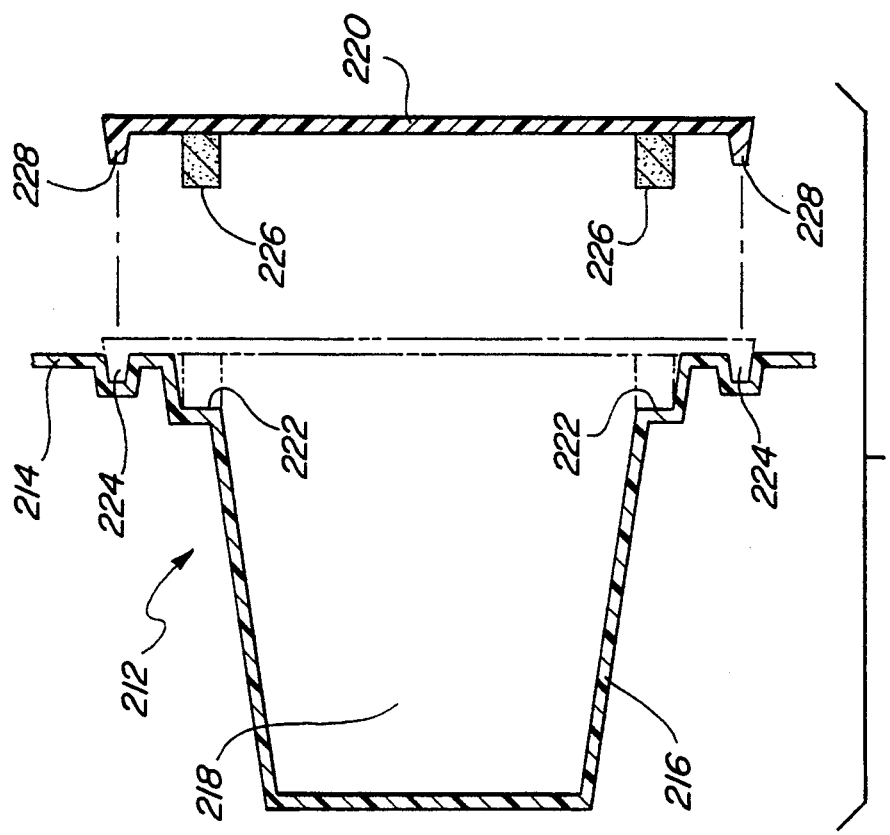
FIG. 4 is a cross sectional of an instrument panel construction in accordance with a third embodiment of the invention.

Yet another embodiment of the invention is shown in FIG. 4. Here the instrument panel construction 212 has a structural instrument panel carrier 214 that not only acts as a cross car beam for connecting the side stantions or side pillars to each other but also has ductwork integrated into it. More specifically the instrument panel carrier 214 includes a cross car portion 216 of U-shaped cross section that forms an open channel or three sides; of a duct 218. The channel is closed by a fourth side that is provided by a duct closeout panel 220 of rigid thermoplastic material that can be formed by extrusion, vacuum forming or injection molding.

The instrument panel carrier 214 has recessed flanges 222 at the transverse or cross car edges of the opening of the cross car portion 216 and transverse grooves 224 that are spaced outwardly of the recessed flanges 222. The transverse grooves 224 have tapered side walls.

The duct close out panel 220 has two elastomeric thermoplastic sealing strips 226 that may be co-molded with the duct close out panel 22. These sealing strips 226 biasingly engage the recessed flanges 222 to seal the duct 218 when the duct close out panel 222 is attached to the instrument panel carrier 214.

The duct close out panel 220 is attached to the instrument panel carrier 214 by ribs 228 at the transverse edges of the duct close out panel 220 that are bonded in the transverse grooves 224. The ribs 228 are tapered so that the ribs 228 center themselves in the transverse grooves 224 and coat both tapered side walls of the transverse grooves 224 with adhesive.

Figure 5:
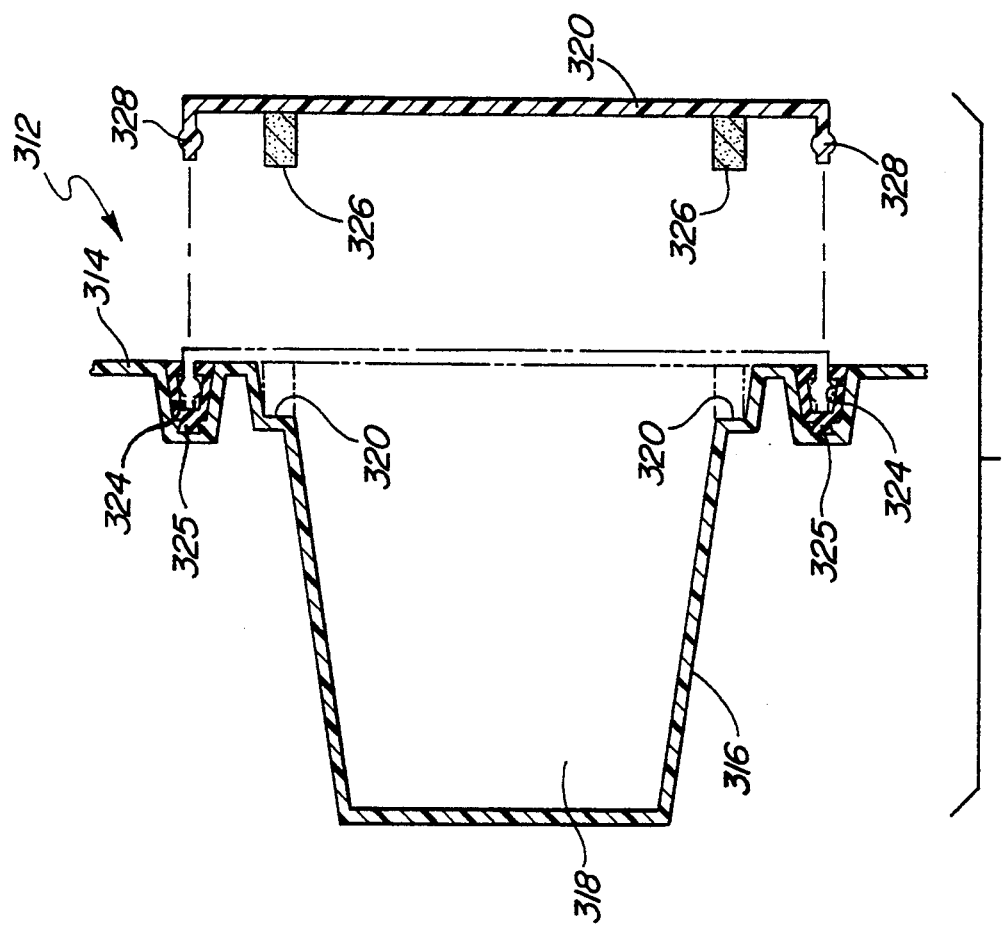
FIG. 5 is a cross section of an instrument panel construction in accordance with a fourth embodiment of the invention.

Still yet another embodiment of the invention is shown in FIG. 5. Here the instrument panel construction 312 has a structural instrument panel carrier 314 that also has ductwork integrated into it as well as acting as a cross car beam for connecting the side stantions or side pillars to each other.

The instrument panel carrier 314 also includes a cross car portion 316 of U-shaped cross section that forms an open channel of a duct 318 that is closed by a duct closeout panel 320 of rigid thermoplastic material that can be formed by extrusion, vacuum forming or injection molding.

The instrument panel carrier 314 also has recessed flanges 322 at the transverse or cross car edges of the opening of the cross car portion 316 and transverse grooves 324 that are spaced outwardly of the recessed flanges 322. The transverse grooves 324, however, are enlarged and hold thermoplastic inserts 325 that act as retainer clips.

The duct close out panel 320 also has two elastomeric thermoplastic sealing strips 326 that may be co-molded with the duct close out panel 322 and that biasingly engage the recessed flanges 322 to seal the duct 318 when the duct close out panel 322 is attached to the instrument panel carrier 314.

The duct close out panel 320 is attached to the instrument panel carrier 314 by bulb shaped ribs 328 at the transverse edges of the duct close out panel 320 that are snap fit into the thermoplastic inserts 325 that are held in the transverse grooves 324 by dovetail connections in the bottoms of the grooves. As indicated above, the thermoplastic inserts 325 act as retainer clips for the bulb shaped ribs 328.

The instrument panel constructions 212 and 312 incorporate ductwork structure and functions in addition to the functions of the structural instrument panel carrier 14 that is disclosed above and described in connection with FIGS. 1 and 2. In other words, these instrument panel constructions may also be the "backbone" of an instrument panel construction that is completed by adding topper pad, glovebox door and other interior surface items. Moreover, these instrument panel constructions can be also assembled off-line as a modular instrument panel assembly and installed through the windshield opening.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An instrument panel construction comprising;
   a structural instrument panel carrier of one piece plastic construction having upper and lower generally vertical back panels that extend across a motor vehicle body for attachment to side pillars located on opposite sides of a vehicle body so as to act as a cross beam connecting the side pillars,
   the instrument panel carrier having a shelf panel for supporting various instrument panel components and carrying a plurality of facial instrument panel coverings for effecting the external appearance of the instrument panel construction, and
   the structural instrument panel carrier of one piece plastic construction being the only cross beam forming part of the instrument panel construction.

2. A structural instrument panel carrier for mounting instrument panel components in a motor vehicle body between pillars located at a Juncture of passenger and engine compartments, comprising:
   a structural instrument panel carrier of one-piece plastic construction having upper and lower generally vertical back panels that extend transversely across a motor vehicle body for attachment to pillars located at opposite sides of the motor vehicle body,
   a generally horizontal shelf panel that interconnects the upper and lower back panels and that extends rearwardly toward the passenger compartment for supporting instrument panel components,
   the upper back panel having a central opening for a modular instrument panel component,
   the lower back panel having an opening for a steering column assembly that is laterally spaced from the central opening of the upper panel,
   the shelf panel and the lower back panel each having a portion that spans the central opening in the upper back panel, and
   a pair of vertical walls at the sides of the central opening in the upper back panel that are connected to respective ends of the upper panel defining the central opening and to the shelf panel that spans the central opening to increase the torsional rigidity of the cross beam.

3. The structural instrument panel carrier for mounting instrument panel components in a motor vehicle body between pillars as defined in claim 2 wherein the upper back panel has an upper section and a lower section that are interconnected by a rib that extends in the rearward direction to support instrument panel components.

4. The structural instrument panel carrier for mounting instrument panel components in a motor vehicle body between pillars as defined in claim 2 further comprising a shelf connecting the vertical walls above the shelf panel to provide a compartment for a radio or the like.

5. The structural instrument panel carrier for mounting instrument panel components in a motor vehicle body between pillars as defined in claim 2 further comprising a plurality of fins integrally attached to the lower back panel and extending forwardly toward the engine compartment to support ducts.

6. The structural instrument panel carrier for mounting instrument panel components in a motor vehicle body between pillars as defined in claim 3 further comprising a second pair of vertical walls connected to respective outboard ends of the rib and the shelf panel.

7. The structural instrument panel carrier for mounting instrument panel components in a motor vehicle body between pillars as defined in claim 2 wherein the upper back panel has a rib that extends toward the engine compartment for supporting ducts.

8. The structural instrument panel carrier for mounting instrument panel components in a motor vehicle body between pillars as defined in claim 3 wherein the upper section of the upper back panel has a rib that extends toward the engine compartment for supporting air ducts and the upper section of the upper back panel has a plurality of air passages that extend through it for distributing air from air ducts supported on the rib into the passenger compartment.

9. A structural instrument panel carrier for mounting instrument panel components in a motor vehicle body between pillars located at a juncture of passenger and engine compartments, comprising:
   a structural instrument panel carrier of one-piece thermoplastic construction having upper and lower generally vertical back panels that extend transversely across the motor vehicle body for attachment to the pillars,
   a generally horizontal shelf panel that interconnects the upper and lower back panels and that projects rearwardly of the back panels toward the passenger compartment for supporting instrument panel components,
   the upper back panel having a central opening for a HVAC module,
   the lower back panel having an opening for a steering column assembly that is laterally spaced from the central opening of the upper panel,
   the shelf panel and the lower back panel each having a portion that spans the central opening in the upper back panel,
   a pair of vertical walls at the sides of the central opening in the upper back panel that are connected to respective ends of the upper panel defining the central opening and to the portion of the shelf panel that spans the central opening to increase the torsional rigidity of the cross beam,
   the upper back panel having an upper section and a lower section that are interconnected by a rib that projects rearwardly of the sections to support instrument panel components and to support a glove box in cooperation with the shelf panel, and
   the upper section of the upper back panel having a second rib that extends forwardly of the upper section toward the engine compartment for supporting air ducts and a plurality of air passages that extend through it for distributing air from air ducts supported on the second rib into the passenger compartment.

10. The structural instrument panel carrier for mounting instrument panel components in a motor vehicle body between pillars as defined in claim 9 wherein the second rib has portions on either side of the central opening that are integrally connected to the pair of vertical walls respectively.

11. The structural instrument panel carrier for mounting instrument panel components in a motor vehicle body between pillars as defined in claim 9 further comprising a shelf connecting the vertical walls above the shelf panel to provide a compartment for a radio or the like and a plurality of fins integrally attached to the lower back panel and extending forwardly toward the engine compartment to support wiring ducts.

12. The structural instrument panel carrier for mounting instrument panel components in a motor vehicle body between pillars as defined in claim 9 further comprising a second pair of vertical walls integrally connected to respective outboard ends of the rib and the shelf panel.

* * * * *